Sept. 10, 1963    R. J. HANKS    3,103,099
TIMING APPARATUS
Filed May 13, 1960
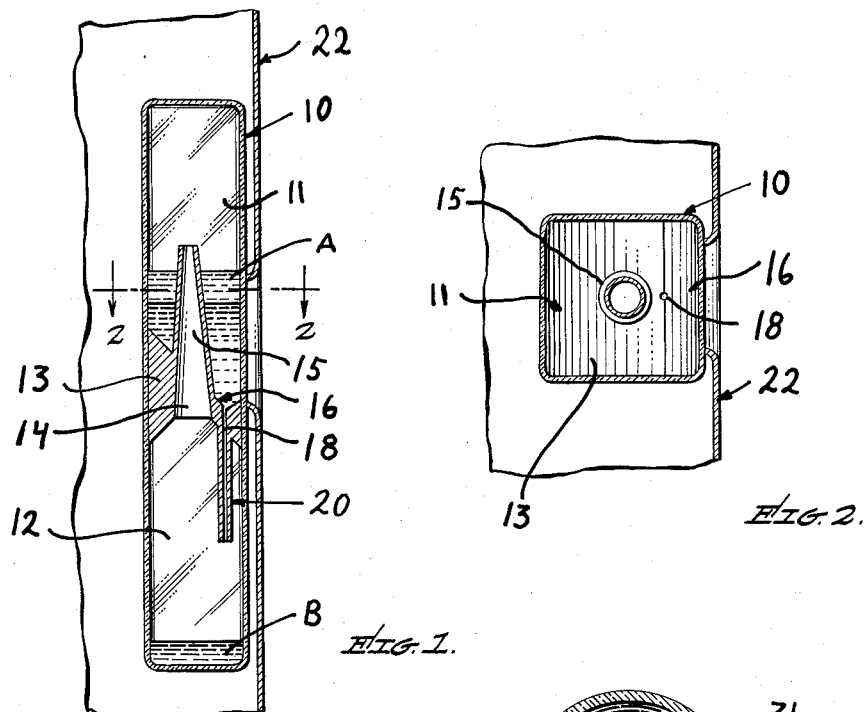
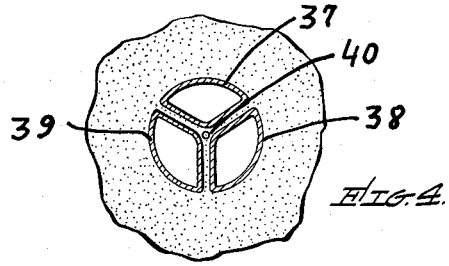
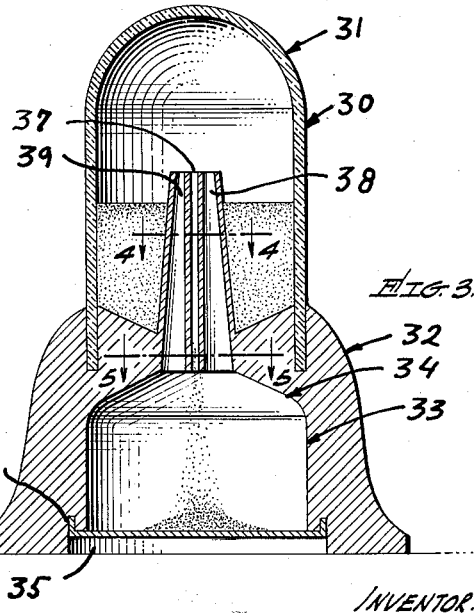
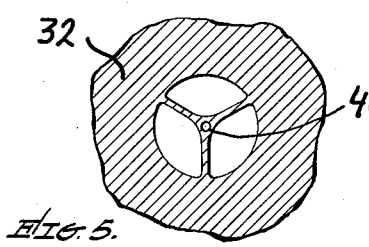
INVENTOR.
RAYMOND J. HANKS,
BY Eric A. Rose
ATTORNEY.

United States Patent Office 3,103,099
Patented Sept. 10, 1963

3,103,099
TIMING APPARATUS
Raymond J. Hanks, 725 W. 21st St., Long Beach, Calif.
Filed May 13, 1960, Ser. No. 28,934
12 Claims. (Cl. 58—144)

My invention relates to improvements in timing apparatus, and particularly their application to hourglasses; and the objects of my invention are, first, to provide a novel method of returning the timing substance quickly to its timing position in the timing chamber after all or a portion of it has come to rest in an hourglass type timing apparatus; second, to provide an hourglass type timing apparatus in which a new timing cycle may be quickly commenced, interrupting a previous timing cycle if desired, by inverting the apparatus for a brief period of time and by then restoring it to the normal timing position without regard to the plane of rotation and without the use of checks or halves; third, to provide a timing device of the hourglass type having a timing substance return tube of relatively large diameter extending into the timing chamber in such a manner as to allow a limited and predetermined quantity of the timing substance to fall quickly from the storage chamber into the timing chamber when the apparatus has been rotated in any vertical plane to an inverted position, and to cause the retention of the timing substance in the timing chamber when the device is restored to the normal timing position commencing a new timing cycle; fourth, to provide a timing apparatus of the hourglass type having a timing substance return tube extending into the timing chamber in such a manner as to cause the retention of the timing substance in the timing chamber when the apparatus, after having been inverted, is restored to the upright or timing position, said return tube being tapered toward the discharge end in such a manner that, while not interfering with the free fall of the timing substance from the storage chamber into the timing chamber when the apparatus is inverted, the restricted size of the discharge opening will limit to an inconsequential amount the accidental loss of the timing substance to the storage chamber.

Additional objects, together with further advantages derived in utilizing the present invention, will become apparent from the following detailed description thereof taken together with the accompanying drawing forming part of the specification, in which—

FIGURE 1 is a cross-sectional elevational view of an embodiment of my invention attached to a container;

FIGURE 2 is a cross-sectional plan view of my device taken on lines 2—2 of FIGURE 1;

FIGURE 3 is a cross-sectional elevational view of a modified form of my invention;

FIGURE 4 is a cross-sectional plan view of my modified device taken on lines 4—4 of FIGURE 3; and FIGURE 5 is a cross-sectional plan view of my modified device taken on lines 5—5 of FIGURE 3.

Similar numerals refer to similar parts throughout the several views.

The invention described in FIGURE 1 and FIGURE 2 in the accompanying drawing comprises a receptacle 10 of tubular shape and substantially square cross-section manufactured of transparent material. The receptacle has an upper portion, designated as a timing chamber 11 and a bottom portion designated as a storage chamber 12 separated by a solid section 13. A circular bore 14 extends vertically through the longitudinal axis of the solid section 13 and communicates with a return tube 15, extending vertically from the solid section 13 into the timing chamber 11. The size of the opening through the bore and and the return tube tapers upwardly from the storage chamber to the discharge end of the return tube located in the timing chamber. The timing chamber 11 has a slanted bottom surface 16 terminating in an inverted cone-shaped portion, the apex of which is located near the side of the timing chamber. A small bore extends downwardly from said apex through the solid section 13, from the timing chamber into the storage chamber, and continues through a tubular extension 18 into the storage chamber; such bore and tubular extension are designated as a timing tube 20. The timing tube extends into the storage chamber to the horizontal plane separating the volume of the storage chamber into two equal parts.

The return tube 15 extends vertically through the apex of the cone-shaped top portion of the storage chamber and continues along the longitudinal axis of the timing chamber to a point located at the center of the horizontal plane which divides the volume of the timing chamber into equal parts.

The tapering of the bore through the solid section and return tube toward the discharge end of the return tube has the effect of reducing to an inconsequential amount the accidental return of particles of the timing substance from the timing chamber into the storage chamber through the return tube when the device, after having been inverted, is then uprighted to its timing position.

The tapering of the bore and return tube must, however, be sufficiently gradual so as not to interfere substantially with the gravitational acceleration of individual particles of the timing substance traveling from the storage chamber into the timing chamber when the device is in the inverted position.

In the embodiment illustrated in FIGURES 1 and 2 of the drawing, two liquids, A, B, of different density and color have been used and illustrated each of sufficient quantity so as to require for its passage through the timing tube a specified predetermined timing period. In connection with the use of liquids, the return tube provides passage for air displaced in the storage chamber during the timing cycle into the timing chamber, the extension of the timing tube into the storage chamber providing passage for air during the resetting operation.

In the illustration shown in FIGURE 1 of the drawing, a liquid is shown in the process of discharging through the timing tube while a second liquid of lesser density and different color has not as yet commenced its passage through the timing tube.

In the embodiment illustrated in FIGURES 1 and 2 of the drawing, the device is affixed to the inside of a larger container or housing 22, having a window-like opening through which the substance remaining in the timing chamber during the timing operation may be observed.

The housing is illustrated in a fragmentary manner partially broken away and in section.

While the device described above is particularly suited for use with apparatus to which it may be conveniently attached, the device illustrated in FIGURES 3, 4 and 5 of the drawing embodying the same principle of my invention, described above, is modified in shape and construction to permit its use independent from any associated apparatus.

The particular device illustrated in the accompanying drawing is limited in its use to granular timing substances because no extension is provided for the timing tube into the storage chamber to serve as an air vent.

As shown in FIGURE 3 of the drawing a timing apparatus is illustrated wherein the timing chamber of transparent material comprises a cylindrical section 30 integrally connected to a semi-spherical section 31, and the storage chamber 32 comprises a substantially cylindrical section 33 integrally connected to a fragmentary conical section 34.

The cylindrical section of the storage chamber 32 is closed at its bottom portion by a cover 36 sealed into a groove provided therefor in the base 35 of the device.

Three tubes, 31, 38, 39, each tapered toward the discharge end, of circular-segmental cross-section, are arranged closely and concentrically about a small opening 40, which opening acts as a timing tube, and is located in the longitudinal center of the solid portion of the device.

As indicated in FIGURES 4 and 5 of the drawing, the bottom portions of the return tubes are formed through bores in the solid center portion of my device, and the top portions of the return tubes extend vertically along the longitudinal axis of the timing chamber and project into said timing chamber to the horizontal plane which divides the volume of the timing chamber into equal parts.

A timing substance is introduced into the timing chamber, in a predetermined quantity to correspond with the time lapse desired; however, care must be taken that such quantity occupies less than one-half of the volume of the timing chamber, so that during the timing operation the highest level of the timing substance is always below the discharge end of the return tubes.

A liquid timing substance or substances may be used only if the apparatus is provided with an extension of the timing tube into the storage chamber so as to form an air vent.

In operation, the timing substance of predetermined quantity will flow through the timing tube during the timing cycle and will be deposited in the storage chamber. Upon completion of the timing operation, or at any time before its completion, the apparatus may be inverted in any vertical plane causing the timing substance to return quickly through the return tube or tubes to the timing chamber. The individual particles of the timing substance being only slightly separated from each other at the inception of their free fall from their point of entry into the return tube, are progressively further separated from each other vertically during the fall, due to acceleration of gravity, so that at the discharge end of the return tube fewer but faster moving particles will be passing at any one instance, allowing for the considerable taper of the discharge tube without substantially impeding the operation of the device.

As the receptacle is uprighted, by rotating it in any vertical plane, the timing substance will flow from the top of the timing chamber along the walls, maintaining a level which will always be below the discharge end of the return tube, to the lower portion of the timing chamber, where it will be retained in position to re-commence a new timing operation by passage through the timing tube.

If the timing substance becomes turbulent during the resetting operation due to rapid or rough handling of the apparatus, the tapering of the discharge end of the return tube will keep to a minimum the escape of timing substance particles.

The relative shape of the timing chamber and storage chamber, respectively, will not affect the efficiency of the device as long as each is approximately symmetrical in shape.

It is understood that various forms of my invention may be used or utilized embodying the principles of my invention, without departing from the spirit of my invention.

I claim:

1. In a device of the class described having a symmetrically shaped timing chamber, a storage chamber positioned below said timing chamber and rigidly affixed thereto, a return tube disposed symmetrically about the longitudinal axis of the timing chamber from the storage chamber to the horizontal plane separating the volume of the timing chamber into two equal parts, said return tube comprising an upper broadly tapered portion and a lower steeply tapered extension extending into the timing chamber.

2. In a device of the class described having a symmetrically shaped timing chamber, a storage chamber positioned below said timing chamber and rigidly affixed thereto, a return tube having a discharge end disposed symmetrically about the longitudinal axis of the timing chamber from the storage chamber to the horizontal plane which separates the volume of the timing chamber into two equal parts, said return tube being tapered upwardly towards the discharge end extending to said horizontal plane of said timing chamber and comprising a broadly tapered portion positioned below said timing chamber and a steeply tapered extension extending into said timing chamber.

3. In a device of the class described, a storage chamber comprising a substantially cylindrical section integrally connected to a fragmentary conical section, a timing chamber integrally affixed to the top of the storage chamber made of transparent material and comprising a cylindrical section integrally connected to a semispherical section, a timing tube of relatively small diameter extending along the longitudinal axis of the fragmentary conical section from the timing chamber into the storage chamber, and a plurality of return tubes closely and concentrically arranged about the timing tube each tube being tapered upwardly towards the discharge end thereof and extending from the storage chamber into the timing chamber about the longitudinal axis of the timing chamber to the horizontal plane separating the volume of the timing chamber into two equal parts.

4. In a device of the class described, a storage chamber comprising a substantially cylindrical section integrally connected to a fragmentary conical section, a timing chamber made of transparent material and integrally affixed to the top of the storage chamber and comprising a cylindrical section integrally connected to a semispherical section, a timing tube of relatively small diameter extending along the longitudinal axis of the fragmentary conical section from the timing chamber into the storage chamber, and a plurality of return tubes concentrically arranged about the timing tube each tube being tapered upwardly towards the discharge end thereof and extending from the storage chamber into the timing chamber about the longitudinal axis of the timing chamber to the horizontal plane separating the volume of the timing chamber into two equal parts thereby causing timing substance particles deposited in the storage chamber to discharge quickly into the timing chamber when the device is in the inverted position.

5. In a device of the class described having a symmetrically shaped timing chamber and a symmetrically shaped storage chamber positioned about the same longitudinal axis wherein the timing chamber is located above said storage chamber, a timing tube extending from the timing chamber into the storage chamber along said longitudinal axis, and a plurality of return tubes tapered upwardly and arranged concentrically about said timing tube in close proximity thereof each return tube having a discharge end extending to the horizontal plane separating the volume of the timing chamber into two equal parts.

6. In a device of the class described, a timing chamber of substantially symmetrical shape, a storage chamber of substantially symmetrical shape arranged below said timing chamber and having a common longitudinal axis therewith, a solid section separating said timing chamber and storage chamber having a bore of small diameter along the longitudinal axis thereof and a plurality of bores of larger diameter concentrically arranged about said bore of small diameter and in close proximity thereof, and a return tube extending from each bore of larger diameter substantially vertically upwardly into said timing chamber to the horizontal plane separating the volume of the timing chamber into two equal parts each return tube tapering upwardly towards its discharge end into the timing tube.

7. In a device of the class described, a timing chamber of substantially symmetrical shape, a storage chamber of substantially symmetrical shape arranged below said timing chamber and having a common longitudinal axis therewith, a solid section separating said timing chamber and storage chamber having a bore of small diameter along the longitudinal axis thereof and a plurality of larger bores of circular-segmental shape concentrically arranged about the bore of small diameter and extending from the timing chamber into the storage chamber, and a return tube extending from each bore of circular-segmental shape upwardly into the timing chamber substantially vertically to the horizontal plane separating the volume of the timing chamber into two equal parts each of said return tubes being tapered upwardly towards the discharge end thereof.

8. In a device of the class described, a timing chamber of substantially symmetrical shape, a storage chamber of substantially symmetrical shape arranged below said timing chamber and having a common longitudinal axis therewith, a timing substance of predetermined quantity disposed in said storage chamber, and means disposed symmetrically about said common longitudinal axis and extending from the storage chamber into the timing chamber to the horizontal plane separating the volume of the timing chamber into two equal parts and passing said timing substance from the storage chamber to the timing chamber quickly by inverting said device in any vertical plane said means comprising a return tube having an upper broadly tapered portion being an integral part of the storage chamber and a lower steeply tapered extension extending radially into said timing chamber.

9. In a device of the class described, a timing chamber of substantially symmetrical shape, a storage chamber of substantially symmetrical shape arranged below said timing chamber and having a common longitudinal axis therewith, and having a timing bore extending radially along said common longitudinal axis a timing substance of predetermined quantity disposed in said storage chamber and means disposed symmetrically about said common longitudinal axis, said means including a return tube extending from the storage chamber into the timing chamber to the horizontal plane separating the volume of the timing chamber into two equal parts of said return tube tapering upwardly towards its discharge end extending to said horizontal plane of said timing chamber and comprising an upper broadly tapered portion being an integral part of the upper portion of the storage chamber and a lower tapered extension extending into the timing chamber.

10. In a device of the class described, the combination of a timing chamber of substantially symmetrical shape containing a timing substance with a storage chamber of substantially symmetrical shape arranged below said timing chamber and having a common longitudinal axis therewith, a return tube of large bore disposed symmetrically about the common longitudinal axis and extending vertically from the storage chamber to the horizontal plane separating the volume of the timing chamber into two equal parts said return tube tapering upwardly towards its discharge end extending to said horizontal plane of said timing chamber, and a timing tube of small bore extending from the timing chamber to the storage chamber.

11. In a device of the class described, the combination of a timing chamber of substantially symmetrical shape containing a timing substance with a storage chamber of substantially symmetrical shape arranged below said timing chamber and integrally connected therewith and having a common longitudinal axis with said timing chamber, a timing tube of small bore extending from the timing chamber into the storage chamber along the common longitudinal axis, and a plurality of return tubes of larger bore closely and concentrically arranged about said timing tube and extending substantially vertically upwards into the timing tube to the horizontal plane separating the volume of the timing chamber into two equal parts, each of said return tubes tapering upwardly towards its respective discharge end into the timing chamber.

12. In a device of the class described, the combination of a timing chamber of substantially symmetrical shape with a storage chamber of substantially symmetrical shape arranged below said timing chamber and having a common longitudinal axis therewith, containing a timing substance, and means disposed symmetrically about said common longitudinal axis and extending from the storage chamber into the timing chamber when said device is inverted in any vertical plane, said means including an upper broadly tapered portion forming an integral part of the storage chamber and a lower tapered extension disposed into said timing chamber.

References Cited in the file of this patent

UNITED STATES PATENTS

| | | |
|---|---|---|
| 2,122,351 | Morris | June 28, 1938 |
| 2,144,857 | Schultz | Jan. 24, 1939 |
| 2,847,067 | Brewer | Aug. 12, 1958 |

FOREIGN PATENTS

| | | |
|---|---|---|
| 23,894 | Great Britain | Oct. 6, 1894 |